Patented Mar. 1, 1949

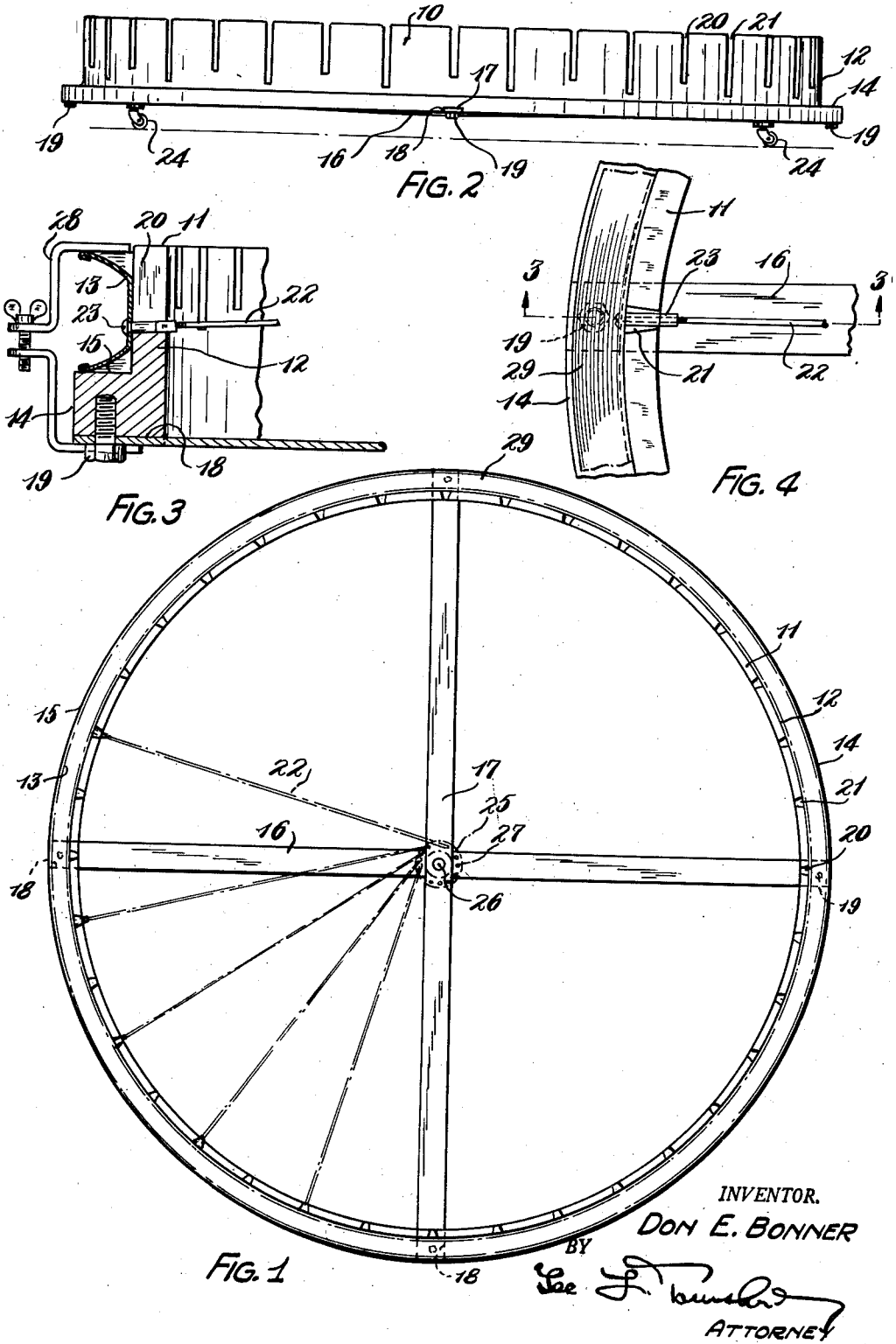

2,463,350

UNITED STATES PATENT OFFICE 2,463,350

STAND FOR SUPPORTING A WIRE WHEEL DURING TRUING OPERATION

Don E. Bonner, Sandusky, Ohio, assignor of one-half to Tutie Palmison, Sandusky, Ohio Application March 31, 1947, Serial No. 738,453

1 Claim. (Cl. 157—1.5)

This invention relates to an improvement in wheel truing stands, and more particularly, to truing stands adapted to receive and support wheels having spokes extending from the hub to the rim thereof. An object of this invention is to provide a new and novel truing stand, adapted to be used by wheelwrights or others, to retain the rim of a wheel during the performance of spoke-adjusting operations, rim adjusting and various wheel adjusting or truing operations.

Other objects are to provide a simple, durable, efficient and easily operated truing stand, which can be manufactured at a relatively low cost and permits a multiplicity of wheel truing, aligning and adjusting operations to be quickly and easily performed thereon.

These and other objects of the invention will be apparent during the course of the following specification, the invention residing in the construction and combination of the parts more fully described herein.

In the drawings, forming a part of the specification:

Figure 1 is a top plan view of an illustrative embodiment of my invention;

Figure 2 is an end view;

Figure 3 is a fragmentary sectional view through an end thereof showing a rim mounted thereon, taken on the line 3—3 of Figure 4; while Figure 4 is a broken top plan view of a portion of the wheel truing stand.

In the drawings the numeral 10 represents the truing stand generally, comprising a ring 11 having a vertically extending portion 12, adapted to support a wheel rim 13 on its outer periphery and provided at its lower portion with a peripheral flange 14, providing a shelf 15 adapted to receive the lower edge of a wheel rim 13 and support it thereon, as shown in Figure 3. The ring 11 preferably is formed of some suitable metal such as aluminum, or the like, and the flange 14 may be formed integrally with the vertically extending portion 12. If desired, the ring 11 may be a casting, such construction providing a strong, durable frame, adapted to be manufactured at a relatively low cost.

Two frame members 16 and 17, disposed at right angles to each other, at their centers, are suitably mounted in countersunk portions 18 along the lower surface of the flange 14, by cap screws 19. Along the top of the flange 14 a series of downwardly extending notches 20 and 21 are provided. It will be noticed that alternate notches 21 are deeper than notches 20, the reason for this construction being to provide seats for spokes 22, which are secured to the wheel rim 13 in corresponding formation at their ends. The outer ends of the spokes 22 are secured to the wheel rim 13 by means of nipples 23 screw-threadedly mounted thereon, permitting radial adjustment of the length and tension of the spokes 22 in a well-known manner.

For some uses it may be found advantageous to mount the truing stand 10 on a support means to permit it to be quickly and easily rotated, and in such instances casters 24, vertically mounted in the lower surface of the flange 14 of the ring 11 may be used. Obviously various means may be provided to permit the truing stand 10 to be readily rotated on its vertical axis and such means are embraced within the contemplated scope of my invention. The hub 25 of a wheel is mounted on a shaft 26, which is adapted to receive the wheel spokes 22 through the apertures 27. This hub 25 is centrally disposed between the intersecting frame members 16 and 17, as shown in Figure 1. These aligned apertures provide means for supporting and centering the wheel rim 13 in the truing device 10.

When the device is used in adjusting and straightening warped or out-of-line rims, it may be necessary to securely hold the various parts of the rim 13 on the truing stand 10, and in such cases it may be advantageous to use clamps 28 illustrated in Figure 3, which function to secure the rim 13 against the upper surface of the shelf portion 15 of the flange 14. For many uses, however, the clamps 28 may not be required.

The depth of the ring 11 and the position and arrangement of the shelf 15 of the flange 14 thereon are such that a wheel 29 may be mounted thereon with the lower edge of the wheel rim 13 seated on the shelf 15 and the lower edge of the wheel hub 25 is substantially flush between the frame member 16 and 17 while the wheel axle shaft 26 extending into the aligned apertures of the frame members 16 and 17 permits the wheel hub 25 to float up and down while the ends of the spokes are being adjusted to position by turning the nipples 23. This construction permits simultaneous adjustments to be made on the wheel 29, both axially and radially. At the same time, the ends of the wheel nipples are retained in the notches 20 and 21 in the top surface of the rim portion 12.

In using the truing stand 10, a wheel 29 is first centered therein, with the stand 10 mounted in horizontal position on a bench or the like, by fitting the wheel axle shaft 26 into the aligned apertures at the center of the frame members 16 and 17 and at the same time seating the wheel rim 13 around the outer periphery of the flange 14 in such manner that the lower edge portion of the rim 13 is seated along the top surface of the shelf portion 15 of the ring 11. The wheel hub 25 may float up and down, providing the spokes 22 are not tightly mounted thereon.

When a wheel 29 is thus mounted on the truing stand 10, the hub 25 is centered in the frame members. The rim 13 is then securely held in circumferential alignment. The tension of the spokes 22 may then be adjusted by using a screwdriver or other tool to turn the nipples 23 at the ends of the spokes 22, and by thus adjusting the tension of the spokes 22 so that they are substantially equal, thus the vector of the forces operating on the wheel 29 are balanced resulting in the production of a balanced wheel which will retain its true shape when removed from the stand 10.

The notches 20 and 21 along the top of the part 12 of the ring 11 prevent rotation of a wheel rim while it is mounted on the ring 11, the alternate depths of such notches corresponding with the alternate spacing of the ends of the spokes.

It will be observed that the truing stand disclosed herein provides means for simultaneously retaining a wheel axially and at the rim thus permitting the tension of the spokes to be readily adjusted while the wheel is thus retained. This device is equally well adapted to be used while fitting the spokes to the rim as will readily be understood.

It will be apparent to those skilled in the art that the embodiment of the invention herein set forth may be variously changed, used or modified, without sacrificing the advantages of the invention or department from the spirit thereof, and that the present embodiment is illustrative only, and that my invention is not limited thereto.

I claim:

A wheel truing stand comprising a ring member adapted to rest on a surface with its axis vertically disposed, support members extending across the lower surface of said ring member and provided with an aperture centrally thereof, a peripherial flange disposed around the lower surface of said ring member forming a horizontally disposed annular shelf portion at its top, said flange being integrally formed with said ring member, said ring member being provided along its top surface with a series of vertically radially disposed notches formed of two different depths, alternately disposed to provide seats for a series of wheel spokes secured to a wheel rim at two alternate distances from the edge of the rim corresponding to the depths of said notches, the annular shelf being positioned and arranged to permit a wheel rim to be seated thereon with the wheel spokes seated in said ring member notches and the inner surface of said rim retained against the outer wall of said ring member above said shelf portion, the shaft of a wheel hub being adapted to be seated in said aperture of said cross members.

DON E. BONNER.

REFERENCES CITED

The following references are of record in the file of this patent:

UNITED STATES PATENTS

| Number | Name | Date |
| --- | --- | --- |
| 620,378 | Stutsman | Feb. 28, 1899 |
| 1,016,184 | Thompson | Jan. 30, 1912 |
| 1,415,865 | Brown | May 16, 1922 |
| 1,791,781 | Wilson | Feb. 10, 1931 |
| 1,949,501 | Thacher | Mar. 6, 1934 |
| 1,995,061 | Hanford et al. | Mar. 19, 1935 |
| 2,219,238 | St. John | Oct. 22, 1940 |